S. Stilwell,
Extension Table.
No. 107,636.      Patented Sep. 20, 1870.
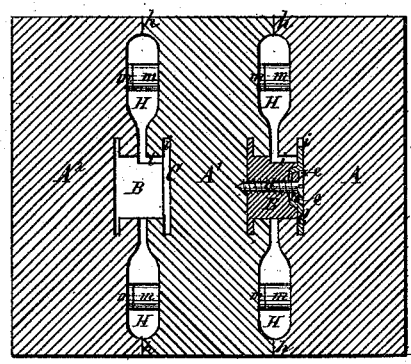
Fig. I.
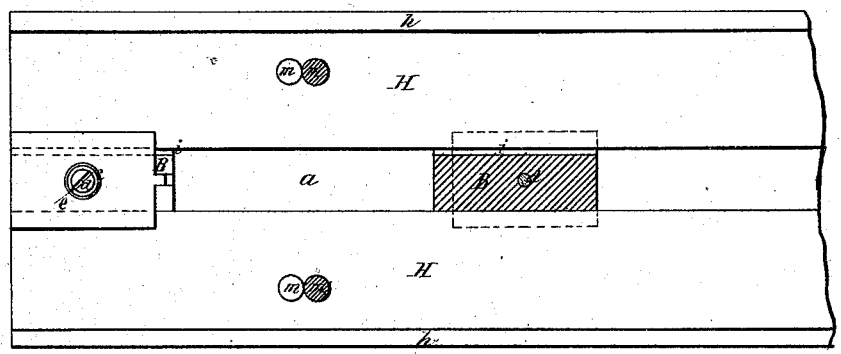
Fig. II.
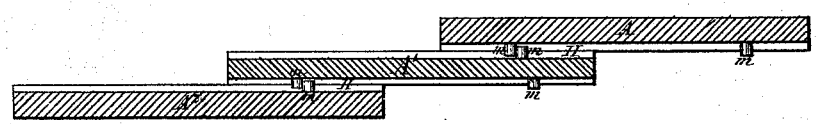
Fig. III.

United States Patent Office.

STEPHEN STILWELL, OF WATERLOO, NEW YORK.

Letters Patent No. 107,636, dated September 20, 1870.

IMPROVEMENT IN SLIDES FOR EXTENSION TABLES.

The Schedule referred to in these Letters Patent and making part of the same.

I, STEPHEN STILWELL, of Waterloo, in the county of Seneca and State of New York, have invented certain Improvements in Slides for Extension Tables, of which the following is a specification.

The slide-bars of extension tables, as heretofore constructed, are connected together by rigid dovetail couplings, which slide in a groove or grooves in the contiguous faces of the bars.

The expansion and contraction of the bars cause this dovetail connection in the one case, to bind, so as to render the operating of the bars quite difficult, while in the other an objectionable looseness in the connection results.

The chief object of my improvements is to prevent these objectionable results; and The invention consists—

First, in the use or employment of a spring or elastic coupling for connecting the extension bars, which will yield with the expansion and contraction of the bars, so as to insure a uniform connection that shall be sufficiently tight to prevent rattling or objectionable play, and loose enough to enable the bars to be readily extended and contracted without binding.

Secondly, of a dovetail slide for connecting the extension bars, made in two parts, when these parts are united by a screw provided with a rubber washer under its head, or their equivalent, which permits the parts to expand and contract as required.

Thirdly, in reducing the key or feather which projects from the face of one of the extension bars into the groove of the contiguous bar, in which it slides on the upper side only, so as to leave a narrow space between it and the upper side of the groove, which insures the free and unobstructed movement of the key therein, and its expansion and contraction, when made of wood, without the bars sagging at the center, as they are liable to do.

In the accompanying drawing—

Figure I is a cross-section of three extension bars provided with my improvements.

Figure II is a face view of a portion of one bar, showing a section of the stop-pins coupling-slide of the contiguous bar.

Figure III is a longitudinal section on a reduced scale.

Like letters of reference designate like parts in each of the figures.

A A$^1$ A$^2$ represent three slide-bars of an extension table.

$a$, a central longitudinal groove, formed in the adjacent faces of each, made of any suitable form to receive the dovetail key or slide, which connects them together.

B represents such key or coupling, one of which is shown in section in Fig. I, with one of its edges fastened in the slide A$^1$, while the other projects and slides in the groove in the bar A.

To this projecting edge I attach a plate, C, of metal, which projects beyond the edges of the key B, so as to form the wings of the dovetail, by which the two bars are held together, against lateral displacement.

This plate C I provide with one or more holes, $c$, countersunk at their edges, so as to receive the head of the screw or screws $d$, by which it is fastened to the key or feather B.

Under the head of this screw, in the countersink, I arrange a spiral spring or rubber washer, $e$, of sufficient thickness to render the fastening a yielding one, so that the plate C can yield as the wooden bars contract or expand under the different degrees of moisture of the atmosphere, thereby insuring a uniform pressure between the contiguous faces of the bars under all circumstances, and a consequent uniformity in the operation thereof.

It is evident that the coupling B C may be constructed in various ways, and still be elastic, so as to accomplish the same desired result, viz., the yielding of the coupling as the extension-bars expand and contract.

Heretofore, to insure the free movement of the guide or feather B in the groove of the bar, the portion of the former which projects therein has been slightly reduced in thickness from both sides thereof. This mode of construction has rendered it difficult to sufficiently reduce the size of the feather to enable it to slide freely without the bars sagging at the center when extended.

By making this reduction from the upper side only, as shown at $i$ $i$, this liability of the bars sagging is avoided, as the bearing of the grooves of the bars comes on the under side only of the slides, as clearly shown in Fig. II, whereby that nicety of adjustment heretofore required is dispensed with, as a greater or lesser space can be left between the upper edge of the feather and the side of the groove, without its operating to destroy the horizontal position of the bars.

H H are the longitudinal grooves or depressions in the adjacent faces of the bars, which are so made as to leave the bearing or surface of contact between the two bars only along the edges, as shown at $h$, which small surface can be kept easily lubricated, so as to insure the sliding of the bars with the least possible friction and liability of binding.

This construction enables the stop-pins $m$ $m$ to be arranged in said grooves for the purpose of arresting the movement of the bars, and preventing the undue extension thereof, as clearly shown in the drawing.

What I claim as my invention is—

1. The combination, with the slide-bars of an extension table, of an elastic coupling or connection, which will yield with the contraction and expansion of the bars, substantially as hereinbefore set forth.

2. The combination, with the extension bars A A¹, the parts B C of a dovetail coupling, and the screw $d$, of the rubber washer and spring $e$, arranged with the latter, and operating as hereinbefore set forth.

3. The rebate $i$, made in the upper side only of the feather or key B of a coupling for extension bars, as and for the purpose hereinbefore shown and described.

STEPHEN STILWELL.

Witnesses:
DANIEL H. BERRY,
J. K. RICHARDSON.